Patented Feb. 4, 1941

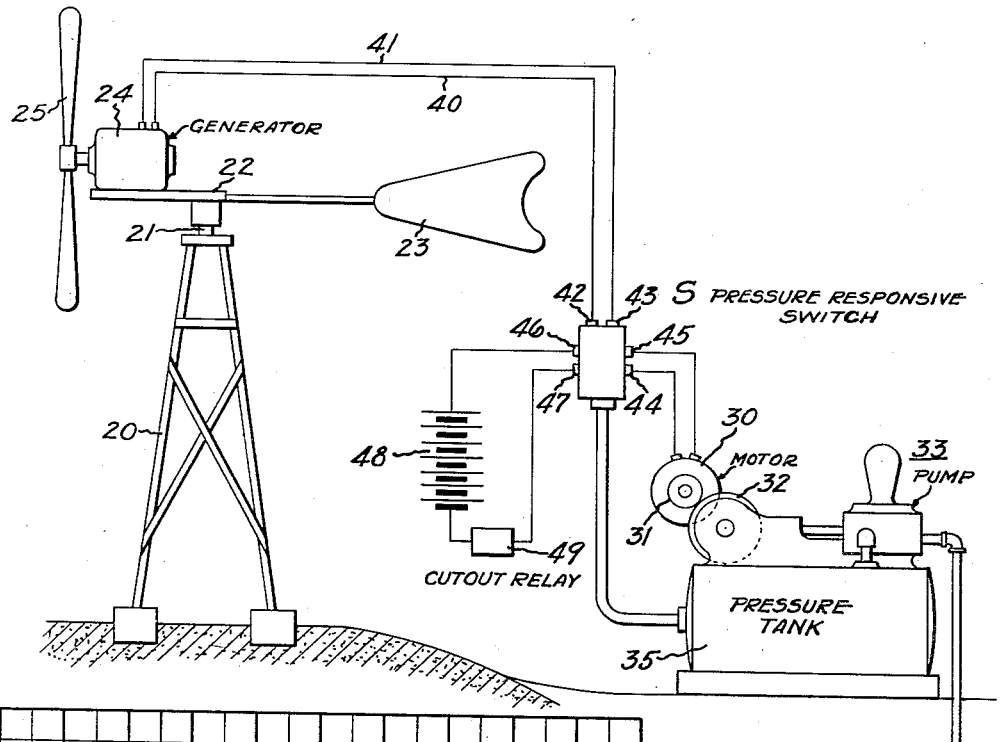
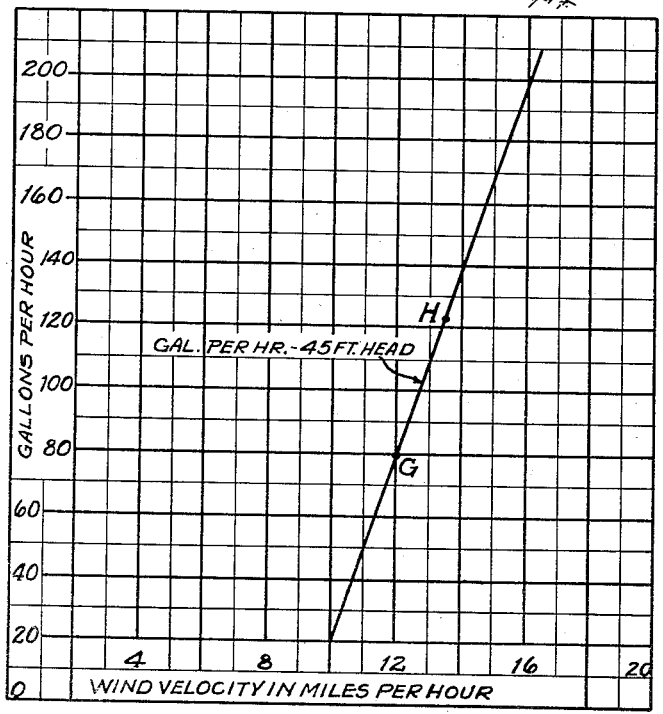

2,230,526

UNITED STATES PATENT OFFICE 2,230,526

WIND POWER PLANT

Edward M. Claytor, Anderson, Ind., assignor to General Motors Corporation, Detroit, Mich., a corporation of Delaware Application July 1, 1938, Serial No. 216,901

11 Claims. (Cl. 290—44)

This invention relates to wind motor power plants, and its object is to utilize a greater power output from the wind motor over the range of wind velocities to which the wind motor is subjected. This aim and object is accomplished by providing a power-absorbing means having such characteristics that it automatically adapts itself to the characteristics of the wind motor, thereby causing the wind-motor to absorb from the wind most all of the power that it is capable of absorbing.

More particularly this invention relates to wind-motor power plants in which the wind-motor furnishes power to operate a work device such as a water pump which absorbs power approximately in proportion to speed. In this connection it is an object of the present invention to derive more power from the wind for operating the work device than possible with wind-motor power plants such as the well-known wind-mill pumping plant which comprises a multi-vane wind wheel motor connected with a water-pump by a mechanical power-transmission having a fixed gear ratio. The multivane wind wheel, or "wind wheel" as it will be termed hereinafter, is characterized by a relatively large number of blades (as many as 16 or more) pitched, with respect to the plane of rotation at a relatively steep angle such as 45 degrees or greater. By reason of this construction, the wind wheel is capable of developing relatively high torque on starting. This is desirable because the wind-wheel is required to start the pump when the wind-wheel starts, since the pump is then connected with the wind-wheel through a mechanical drive of a certain fixed gear ratio. In other words, the wind-wheel must start with the load of starting the pump. After the pump starts, the wind-wheel quickly accelerates to reach a speed at which the power output from the wind-wheel balances the power requirements of the pump. In a wind-wheel pumping plant the power which the wind-wheel is able to absorb from the wind while driving the pump through the mechanical transmission of fixed gear ratio is much less than the wind-wheel is capable of absorbing from the wind due to the fact that there is no way of changing the gear ratio of the mechanical drive between the wind-wheel and the pump. That gear ratio, which was determined by the requirements of starting the pump when the wind blows moderately, is too high in value to enable the wind-wheel to derive approximate maximum power from the wind after the pump has been brought up to speed. At the stable operating speed, I find the wind wheel turning too fast for best power absorption, and the pump running too slow for best power consumption. Furthermore, if the gear ratio is high enough to permit the wind-wheel to drive the pump in a wind of 10 M. P. H. velocity, the gear ratio would be far too high for efficient operation of the plant when the wind blows at 20 M. P. H. The wind-wheel would be capable of taking very much more power out of the wind than the geared pump could absorb. If the gear could be shifted from low pump speed to high pump speed, as in an automobile where gear shifting raises car speed, the wind-wheel could be loaded and thereby caused to develop more power from the wind, just as an automobile engine is caused to develop more power because of the increased power demand upon it which inevitably follows the shifting of the transmission from low to intermediate and high car-speed gear. In the case of the wind-wheel, the loading of it by decreasing the gear ratio so that the pump speed increases relative to wind-wheel speed causes the wind-wheel to slip in the wind and thereby to absorb more power from the wind. (The term "slip" applies to the decrease of wind-wheel speed below its synchronous speed for a given wind velocity. The term "synchronous speed" is used by those skilled in this art to denote that speed at which the wind-wheel would rotate in a breeze of a given velocity when the wind-wheel develops no power.)

This invention aims to reconcile two apparently conflicting conditions, namely, (1) to pump more water, the pump should run faster, (2) to enable the wind-motor to absorb more power from the wind its R. P. M. should be slower.

In order to accomplish the objects of the present invention, I have conceived of the sort of power transmission between the wind-motor and the work-device which, instead of having only one fixed gear ratio, operates to provide a variable gear ratio which is automatically varied according to circumstances in order that the wind-motor can be loaded after the pump starts and thus caused to develop a relatively large percentage of the power that the wind-wheel is capable of developing from the wind. I have discovered that an ideal combination of devices which will absorb the most power from the wind is the combination of a propeller-type wind-motor driving a shunt wound generator directly connected to a series wound electric motor which operates a water pump or other work device capable of absorbing power approximately in proportion to speed. The operating characteristics of the various units of the combination bear a definite relation to one another as will be explained hereinafter. When the units are so designed that their operating characteristics are properly related, the electrical transmission system from the propeller-motor to the pump provides an automatically changing gear-ratio coupling between them, which permits the propeller-motor to start rotating and come up to speed and develop a torque sufficient to start the pump and then automatically change in ratio to increase the pump speed relative to the propeller-motor speed and thus load the propeller-motor and to cause it to operate at a lower percentage of its synchronous speed for a given wind velocity whereby it develops more power.

A propeller type-wind-motor, as distinguished from a multi-vane wind-wheel, has a small number of blades (usually two, but not more than four) shaped like airplane propeller blades. The pitch of the blades relative to the plane of rotation is much less than the pitch of the blades of the multi-vane wheel. On account of these differences, the propeller-motor (term used hereinafter to designate the propeller-type wind-motor) has low torque on starting but operates at a higher speed in a given breeze than a multi-vane wind-wheel of the same blade radius. At the higher speeds the propeller-motor torque increases rapidly. On account of these characteristics the propeller motor is the preferred type of wind-motor for operating a generator, because the generator can be started on low torque and because the generator can be made smaller and is less expensive, than the larger slower-speed generator required for operation by the slower moving multi-vane wind-wheel to give the same output. Furthermore, the electrical-generating plant operated by a propeller-motor has a higher utility factor than the electrical generating plant operated by a multi-vane wind wheel. (The term "utility factor" is the measure of the ability of the generator to cause the wind-motor automatically to absorb the power that is available in the wind, without the use of external controlling devices.)

Further objects and advantages of the present invention will be apparent from the following description, reference being had to the accompanying drawings, wherein a preferred embodiment of the invention is clearly shown.

In the drawings:

Fig. 1 is a diagram of a wind electric pumping system embodying the present invention.

Fig. 2 is a chart showing gallons of water per hour in relation to wind velocity in miles per hour when the water pump operates at a 45-foot head.

Fig. 3 is a chart showing generator performance curves for voltage and R. P. M. with various values of constant current output.

Figure 7:
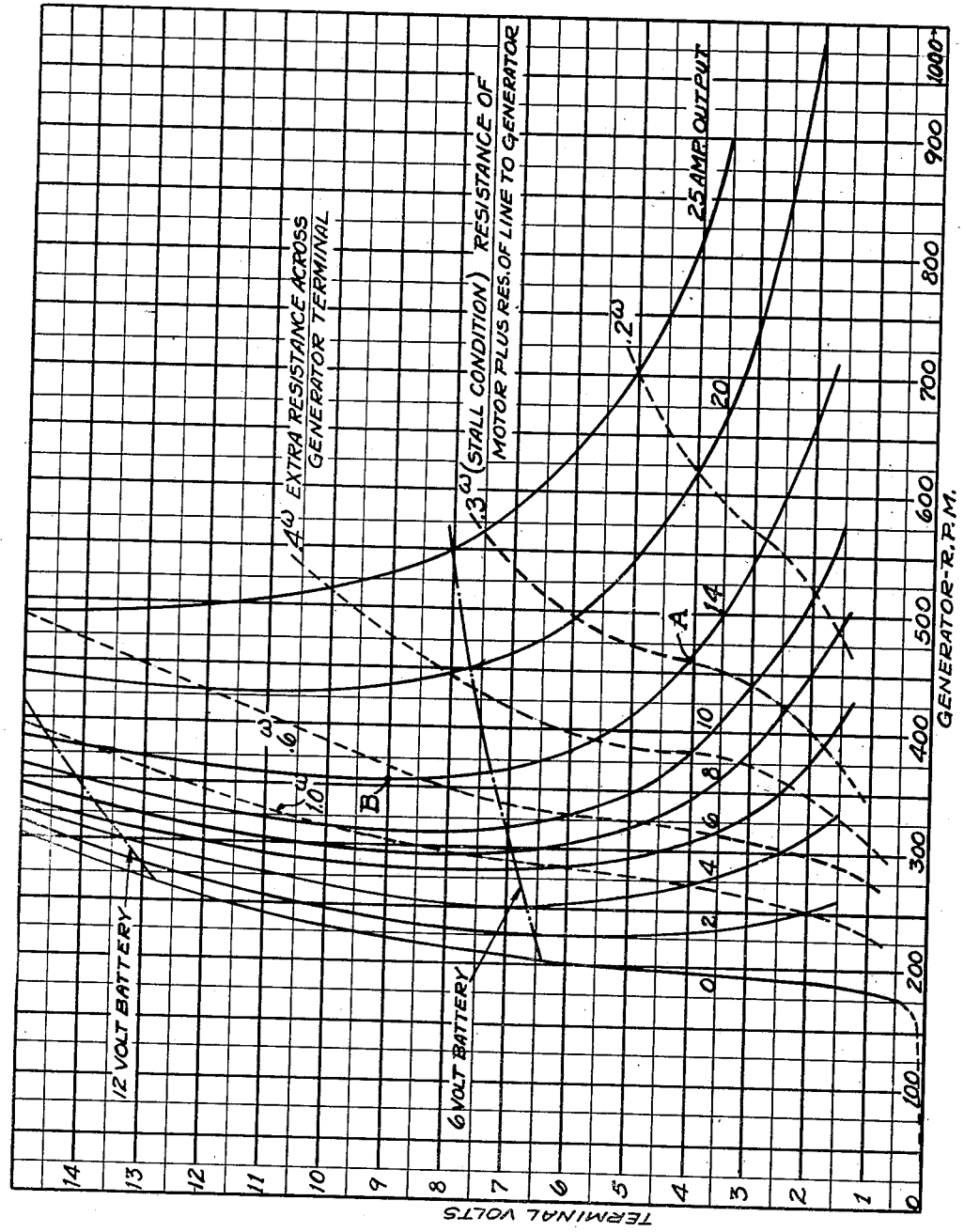
Figure 4:
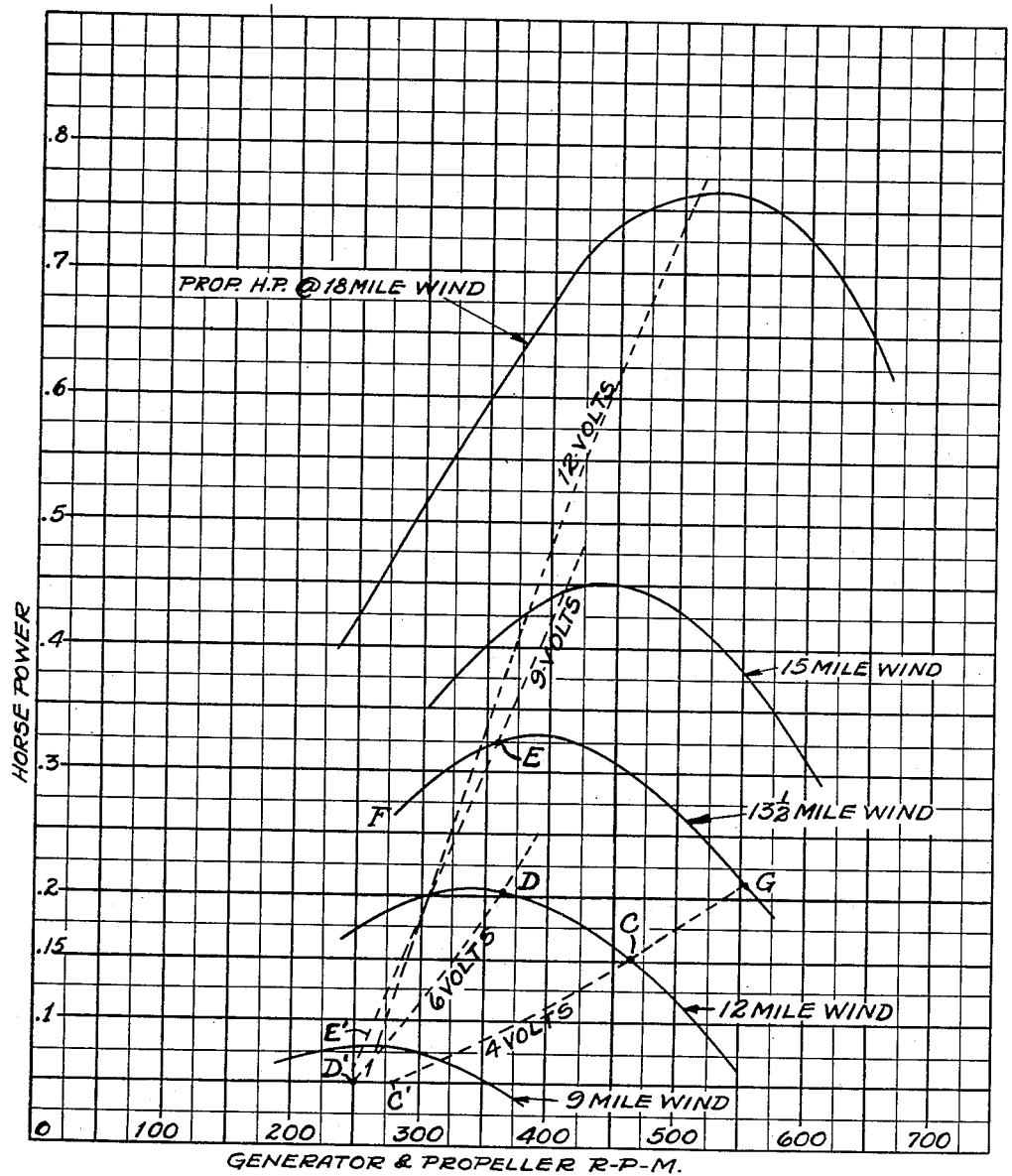

Fig. 4 is a chart of horsepower at various speeds showing propeller motor horsepower output for different wind velocities and required generator horsepower input at certain voltages.

Referring to Fig. 1, 20 designates a wind motor tower carrying a shaft 21 which pivotally supports a bracket 22 carrying a tail vane 23 and a generator 24 directly driven by a motor 25. 30 designates a series wound electric motor directly driving a gear 31, meshing with a gear 32 which operates a pump 33 which pumps water from a well 34 and delivers it to a pressure tank 35 which is connected with the water system, not shown.

The generator terminals are connected by wires 40 and 41 with terminals 42 and 43 of a switch S, having terminals 44 and 45 which are connected with the electric motor 30. The switch has also terminals 46 and 47 connected with a storage battery 48. Switch S is pressure-responsive so that, so long as the pressure in tank 35 is below a certain predetermined value, switch terminals 42 and 43 will be respectively connected with terminals 44 and 45 in order that the electric motor 30 will be directly connected with the generator 24 to operate the pump 33. When the pressure in the tank 35 exceeds a certain amount, the switch S will automatically disconnect terminals 42 and 43 from terminals 44 and 45, and will connect them respectively with terminals 46 and 47 so that, while the pump is not being operated the generator will charge the storage battery 48.

The following example is given of dimensions of the various units of the system which have produced satisfactory results.

The propeller motor 25 is an 8-foot, two-blade propeller of the type commonly used with wind-driven generators. The generator 24 is shunt wound and the motor 30 is series wound. The generator 24 and the motor 30 are substantially mechanical duplicates. They have the same field frames, pole pieces, armature cores and commutators. The armature cores are 4¾" in diameter and 2⅝" long and each has 20 slots. The commutators each have 41 bars. The resistance of the motor brushes is lower than the resistance of the generator brushes. The generator armature is wound so that it has six turns of #15 copper wire per commutator bar. The motor armature has eight turns of #16 copper wire per commutator bar. The generator field has a liberal amount of copper so as to furnish the necessary excitation at low speed to run the pump and so as not to burn up when the generator is delivering as much as 14 amps. at 12 volts. The generator is designed with respect to the propeller so that its horse power input characteristic conforms to the propeller horse power output characteristic. More particularly the generator capacity is large relative to the propeller diameter so that, during normally strong winds, the propeller will not over-speed. As there are no overload protecting devices in the circuit, the power absorbing capacity of the generator is less than the stalled capacity of the electric motor, so that the motor will not burn out in case the pump fails to start. The motor is designed so that it will absorb the power from the propeller and generator when rotating at a speed or speeds (during moderate winds) which represent approximately the peak values of horse power from the propeller. It is highly important that the generator and pump motor be designed to work together. Such special care in design does not necessarily mean more expensive design, but matched performance curves are essential for best results.

The water pump 33 is driven by the electric motor 30 thru the gearing 31 and 32, which gives a two-to-one gear reduction. The motor 30 is rated at one-fourth horse power. It was found that the pump would start on a generator voltage of from 4 to 6½ volts. The motor torque would be between 2.75 and 4.25 foot pounds. Twice this torque is available to the pump on account of the gear reduction. (These figures are predicated on starting against a 40-foot head and a line resistance of not over .07 ohm.) The design of the system is such that, if the electric motor would not start on reasonable values of torque, the torque would build up rapidly with increased generator voltage. As generator voltage increases, the current delivered to the motor increases. Since the motor is a series motor, its torque increases at a rate greater than the first power of current increase. Hence the torque of the motor increases very rapidly with increase of general voltage.

It will be apparent from the following example of the operation of the system that the electric transmission from the propeller-motor 25 to the pump 33 operates when starting the pump in a manner equivalent to a very high speed ratio (equivalent to what is termed "low gear" in an automobile transmission) and then operates automatically to change the gear ratio to a lower value (equivalent to shifting into "high" gear in an automobile) as the propeller speeds up.

Let it be assumed that .3 ohm is the resistance offered by the motor 30, plus the resistance of the line to the generator 24 just at the time the pump begins to start and that the current required for starting is 14 amps. Referring to Fig. 3, point A is the intersection of the 14 amp. curve with the .3 ohm curve. It will be noted the generator terminal voltage is approximately 4.2 volts and the generator speed is 465 R. P. M. After the pump starts, the generator voltage will rise due to the fact that the effective resistance of the motor increases due to the increase of its voltage. Assuming that the current of 14 amps. remains the same and that the wind velocity is sufficient to bring the generator voltage up to 9 volts, it will be noted that the generator speed falls back to 360 R. P. M. This is represented by point B on the 14 amp. curve where it crosses the 9-volt line. This rise in generator voltage is due to the following:

As the pump starts, the current delivered to the motor 30 begins to decrease due to the disappearance of static friction of the pump. The generator voltage begins to rise because (1) the C. E. M. F. of the motor increases, and (2) the line drop to the motor decreases and the internal drop in the generator decreases. As the voltage rises, the generator excitation increases, which again promotes a further rise in generator voltage. The accumulative effect of the foregoing rises results in a material increase of generator terminal voltage although the generator speed has been reduced. All this is possible with the same amperes being delivered as when the pump motor 30 was started. Increase in generator output voltage where amperes remain the same, means increase of power developed by the generator; hence it is apparent that a balance will be reached between the horsepower output of the propeller motor 25 and the horsepower absorbed by the generator 24.

From the foregoing it is apparent that the wind velocity will be the determining factor of final generator voltage. A low wind will cause the generator voltage to balance off at a moderate value. A high wind will cause the generator to deliver a considerably higher voltage resulting in much increased pump speed, thus absorbing all the power that is developed by the propeller, less the loss in the units and the line.

In general, the losses in the system remain about the same with variations in speed. The frictional losses in the generator vary but little. The line losses are about the same because the current remains substantially constant. The small variation in the loss between the motor and the pump is due to variation in speed.

It is apparent from the foregoing that the combination of a propeller-motor-driven generator directly connected to a series motor operating a water pump or other power-absorbing device is ideal for absorbing the greater proportion of the power that can be developed by the propeller-motor. As stated in the previous example, the pump may start when the generator is operating at about 465 R. P. M. and delivering around 4-volts. This condition is represented by the point C on the chart Fig. 4 where the 465 R. P. M. line is crossed by line C'—C representing H. P. absorbed by the generator at 4-volts. This point substantially coincides with the line D—C representing propeller H. P. for various propeller R. P. M. at wind velocity of 12 M. P. H. The horsepower output from the propeller and horsepower input into the generator is approximately .15 H. P. As indicated by point D, at this same wind velocity, the generator will deliver around 6-volts at 360 R. P. M. The horsepower absorbed by the generator has increased from .15 H. P. to .2 H. P. As the pump speed increases, the generator H. P. curve swings from C'—C (the 4-volt curve) towards D'—D (the 6-volt curve). The point where the generator H. P. curve crosses the propeller H. P. curve at 12 M. P. H. will represent the stable operating point. When a steady running condition is reached the power delivered by the propeller will equal the power absorbed by the generator at some generator voltage which would be represented by a line similar to line D'—D. It will be noted that the intersection of the generator input H. P. curve with the propeller output H. P. curve for a given wind velocity moves from a point (such as C) down on the drooping side of the propeller H. P. curve to a point (such as D) nearer to the maximum of propeller H. P.

If the pump motor was accelerated from rest under the influence of a 13½ M. P. H. wind, the horsepower input to the generator at starting is .21 H. P. as indicated at point G where the curve C'—C representing generator H. P. input at 4-volts crosses the propeller H. P. curve at 13½ M. H. P. wind velocity. During running, the horsepower absorbed by the generator is .325 H. P. as indicated at point E where the 13½ mile wind line crosses the 360 R. P. M. ordinate.

It should be noted again that the intersection point of propeller output at 13½ M. P. H. wind velocity with generator absorbed horsepower has moved from a point (like G) down the drooping side of the propeller H. P. curve toward a point (like E) nearer to the maximum of propeller horsepower at 13½ M. P. H. wind velocity.

Referring again to Fig. 4, it will be noted that the points D and E which have been discussed are located, respectively, near the maximum of the 12 M. P. H. and 13½ M. P. H. wind lines. It is noted that the generator input horsepower line at 9-volts intersects the 15 M. P. H. wind line near its maximum, and that the generator input horsepower line at 12-volts intersects the 18 M. P. H. wind line near its maximum. It is therefore reasonable to state that the plant so operates that the pump motor requires that the horsepower required to be absorbed by the generator can be represented by a curve approximating the loci of maximum points on the propeller output horsepower curves for various wind velocities throughout a moderate range.

Point E lies on the line E'—E which represents the horsepower absorbed by the generator at 9-volts. Therefore the condition represented by point E on Fig. 4 corresponds to the condition represented by point B on Fig. 3. This means that the change in generator operation from operation at 465 R. P. M., 4-volts, 14 amperes at the starting of the pump motor to operation at 360 R. P. M., 9-volts, 14-amperes during the stable running of the pump motor, is based on the premise that the wind velocity has changed from 12 to 13½ M. P. H.

It is apparent from the foregoing that, after the pump starts, a small increase in wind velocity will result in a large increase in pump speed. This is all due to the fact that, if the propeller is allowed to whip up to speed under a small load, thereafter the load can be increased, as if by an automatic gear-ratio changing device, thus causing the propeller to "slip" below synchronous speed and take greater advantage of the power developed by the wind. The term "synchronous speed" as used in the specification and claims means the idling speed of the propeller for any given fixed wind velocity. In other words, it is that speed which the propeller would have at a given wind velocity when there is a no-load on the propeller other than the friction of its bearings.

The marked increase in pump output when the wind velocity changes from 12 to 13½ M. P. H. will be apparent by reference to Fig. 2 where point G is the intersection between the 12 M. P. H. ordinate and the gallons per hour line, and the point H denotes the intersection between this line and the 13½ M. P. H. ordinate. It will be noted that the gallons per hour at 45 foot head has increased from approximately 80 gallons per hour to 123 gallons per hour, while the wind velocity has increased only 1½ M. P. H. Part of this increase is due to increase in pump efficiency, but mostly due to increase in ability of the system to take advantage of the power which can be developed by the wind.

Referring to Fig. 4, it is interesting to note that the curve C'—C which represents a portion of the generator horsepower curve for 4-volt operation is only the lower part of the curve and is that part having a relatively gradual slope. This accounts for the fact that the starting of the plant into operation is very easy since the generator is delivering power at first according to the lower part of its 4-volt characteristic curve. Accordingly there is high torque and low power. As the motor speed increases, the generator voltage increases, thereby causing the motor to run even faster until its connected load can absorb all the output of the generator. Hence, with this combination of pump operated by a series motor directly connected electrically with a propeller-motor operated generator, the propeller can operate appreciably below its synchronous speed where its output is high, and yet operate the pump at high speed. In other words, the equipment automatically goes into "high" (using the term in the sense used in connection with automobile change speed gearing) after the slow high torque drag at starting.

Calculations indicate that, when proceeding from the starting to the running condition, the stable point of operation on the wind wheel output horsepower curve will always move from the drooping end back nearer to the maximum value. This is apparent by noting that the point C is on the drooping end of the 12-mile wind curve in Fig. 4, and that the point D is nearer to the maximum. This means that the electric motor will begin to run at relatively low wind velocity, such as 12 miles per hour and that, as the propeller-motor increases in speed with higher wind velocities, the electric motor will increase its speed at a faster rate than the rate of increase of wind velocity. Referring again to Fig. 2, it will be noted that the pump output has rapidly increased from 80 to 123 gallons per hour with an increase of 12 to 13½ M. P. H. wind velocity, whereas wind wheel speed has actually decreased from 465 to 360 R. P. M., as will be noted by comparing the speeds at points C and D in Fig. 4.

By reason of the automatic gear change effect produced by the electric transmission between the propeller 25 and the pump 33, it is apparent that the efficiency of the system has been materially increased because many more gallons per hour can be pumped by a plant constructed according to the present invention than by the conventional type of wind wheel driven pumps in which the wind wheel is connected with the pump by mechanical gearing of fixed gear ratio. The present system should give longer life to the pump parts because, over a large percentage of the total time of operation, the pump will run at relatively low speed. The present system can be used advantageously with wells where the water supply has hitherto been limited to a low output because of slow speed pumping. The system could be used to advantage where it is desirable to locate the wind motor and well in separate places. However, the greatest advantage is due to the operation of the electric transmission in the manner of a flexible gear ratio coupling which effects the pumping of more gallons per hour in moderate wind than is possible with the conventional wind mill pump.

It is also possible to use one generator to provide current for operating the pump motor and also to supply current for radio apparatus. The pumping system can be used to operate the automatic switch S for shifting the wires leading from the generator either to the pump motor or to a storage battery from which current may be taken to operate a radio. If a battery is to be charged when not operating the pump, a cut-out relay indicated at 49 in Fig. 1 should be connected in circuit with the battery.

While the embodiment of the present invention as herein disclosed constitutes a preferred form, it is to be understood that other forms might be adopted, all coming within the scope of the claims which follow.

What is claimed is as follows:

1. A wind power plant comprising a propeller-motor; a power absorbing device; and an electrical transmission between the propeller-motor and device and comprising a generator driven by the propeller-motor and an electric motor driving the device, said generator and electric motor being substantially mechanical duplicates, the generator having a shunt field and the electric motor having a series field, and having characteristics so related to each other and to the characteristic of the propeller that, on starting the device, the electric motor develops high torque but low power and that, on running the device, the electric motor requires a horsepower input to the generator approximating to the maximum propeller horsepower at a given wind velocity.

2. A wind power system comprising a propeller-motor, a generator driven by the propeller-motor and having power absorbing capacity sufficient to prevent overspeeding of the propeller-motor in normally strong winds, and means for loading the generator in accordance with the ability of the propeller-motor to develop power from the wind, said means including a series electric motor directly connected with the generator and a work device driven by the motor, said device absorbing power approximately in accordance with its speed of operation the power absorbing capacity of the generator being less than the stalled capacity of the electric motor.

3. A wind power system comprising a propeller-motor, a generator driven by the propeller- motor and having power absorbing capacity sufficient to prevent overspeeding of the propeller-motor in normally strong winds, and means for loading the generator including a series electric motor directly connected with the generator and a work device driven by the motor, said device absorbing power approximately in accordance with its speed of operation, said electric motor providing relatively high torque while requiring relatively low power when starting the work device into operation in order to permit the propeller-motor to accelerate toward synchronous speed, then, as the speed of the work device increases, the generator loads the propeller-motor to cause its speed to decrease and thereby to develop approximately maximum power, the increase of generator voltage with decreased speed being due to the generator voltage increasing with increase of counter electromotive force of the electric motor, the power absorbing capacity of the generator being less than the stalled capacity of the electric motor.

4. A wind power system comprising a propeller motor, a work device capable of absorbing power approximately in proportion to its speed of operation, and electrical transmission means between the propeller motor and work device and comprising a generator driven by the propeller motor and directly connected with a series electric motor which drives the work device, said generator having power absorbing capacity sufficient to prevent overspeeding of the wind-wheel in normally strong winds, but a capacity less than the stalled capacity of the electric motor, said electric motor, when stalled, permitting the generator to supply current at low voltage thereby permitting the propeller motor to increase in speed, said electric motor, after starting delivering a counter electro-motive force which raises the generator voltage and causes the generator to develop more power and to reduce the speed of the propeller motor further below synchronous speed thereby causing the propeller motor to develop approximately the maximum power from the wind.

5. A wind power system comprising a propeller motor, a work-device which absorbs power approximately in accordance with its speed of operation, and electrical power transmission means between the propeller motor and work-device for causing the work-device to start on low power but relatively high speed operation of the propeller motor and, as the speed of the work-device increases, the propeller motor is loaded to cause the speed of the propeller motor to slip further below synchronous speed and thus to absorb more power from the wind, said electrical transmission means including a generator driven by the propeller motor and a series electric motor directly connected with the generator and driving the work-device.

6. A wind power system comprising a propeller motor, a work-device which absorbs power approximately in accordance with its speed of operation, and electrical power transmission means between the propeller motor and work-device and including a generator driven by the propeller motor and a series electric motor directly connected with the generator and driving the work-device, the generator having a power absorbing capacity sufficient to prevent overspeeding of the propeller motor in normally strong winds but a capacity less than the characteristics of the electric motor and generator being so related that the point of intersection of that generator current curve (based on generator voltage and speed) representing such current value as to cause the electric motor to start the work device with that resistance curve representing ohmic resistance of the motor, when stalled, plus the line resistance, is a point denoting relatively low generator voltage and relatively high generator speed, whereby, on the starting of the work device into operation the propeller motor is permitted to accelerate toward synchronous speed, and said characteristics being so related that, as the work-device speed increases, the counter electro-motive force of the electric motor increases to cause the generator voltage and power to increase while the generator speed decreases due to loading of the propeller motor which causes the propeller motor speed to slip further below synchronous speed, thereby causing the propeller motor to develop approximately maximum power from the wind.

7. A wind power plant comprising a propeller motor, a generator driven by the propeller motor and having sufficient power absorbing capacity to prevent over-speeding of the wind-wheel in normally strong winds, a series electric motor directly connected with the generator, and a work device driven by the electric motor and capable of consuming power approximately in accordance with its speed, the characteristics of said generator and electric motor being so related to each other and to the propeller motor that, at the starting of the work device, the generator voltage line intersects the drooping or negative slope portions of the propeller motor horse-power curves for various wind velocities and generator speeds, that point of intersection being a substantial distance from the maximum points of the propeller motor horse-power curves, and that, as the work-device speed increases, the generator voltage line intersects the propeller motor horse-power curves at points near the maxima thereof.

8. A wind-motor power plant comprising the combination of a wind-motor, a mechanical work device operated from a shaft and capable of absorbing power approximately in proportion to its speed, and means for transmitting power from the wind-motor to the work device said means including provisions whereby, upon starting the work device into operation, high torque at low power is applied to the work device, whereupon the work device shaft turns relatively slowly as compared with the rotative speed of the wind-motor, thereby permitting the wind motor to pick up in speed and to develop more power, and whereby upon increase of speed of the work device, the work device shaft turns relatively fast as compared with the speed of the wind motor, thereby causing the wind motor to operate at a lower percentage of synchronous speed at which it develops more power.

9. A wind motor power plant comprising the combination of a wind motor, a mechanical work device operated from a shaft and capable of absorbing power approximately in proportion to its speed, and electrical means for transmitting power from the wind motor to the work device and comprising an electric generator driven by the wind motor and directly connected with a series electric motor which drives the work device operating shaft, the characteristics of the generator and electric motor being so related to each other and to the wind-motor and work-device that, upon the starting of the wind motor, the ratio of the wind motor speed to the work device speed is relatively high, and whereby, upon increase of speed of the work device after starting, this ratio is caused automatically to decrease thereby causing the wind-motor to operate at a lower percentage of synchronous speed at which it develops more power.

10. A wind power plant comprising a wind-motor, a generator driven thereby, and means for regulating the output of the generator so that its output curve for various wind velocities will approximately coincide with the loci of the maxima of wind-motor horse-power curves, said means comprising a series electric motor directly connected with the generator and a work machine operated by the electric motor, said work machine being capable of absorbing power approximately in proportion to its speed of operation.

11. A wind power plant comprising a wind motor prime mover, a shunt generator driven by the wind motor and absorbing energy therefrom, a series electric motor electrically connected to the generator and receiving energy from the generator and a water pump driven by the electric motor and operating against a pressure head, said wind-motor, generator, electric motor and pump each having inherent operating characteristics so related as to cause the power plant of which these units are a part to operate approximately at the best output for any given wind velocity, the regulation being accomplished by the relative balancing speeds assumed between the power generating units and the power receiving units acting in combination and automatically as a result of a change in wind velocity.

EDWARD M. CLAYTOR.